(12) United States Patent
Zhao et al.

(10) Patent No.: US 11,104,305 B2
(45) Date of Patent: Aug. 31, 2021

(54) AUTOMOTIVE IMAGE SENSOR SURFACE WASHING AND DRYING SYSTEM

(71) Applicant: DLHBOWLES, INC., Canton, OH (US)

(72) Inventors: Chunling Zhao, Ellicott City, MD (US); Shridhar Gopalan, Westminster, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 16/235,459

(22) Filed: Dec. 28, 2018

(65) Prior Publication Data

US 2019/0202410 A1    Jul. 4, 2019

Related U.S. Application Data

(60) Provisional application No. 62/612,364, filed on Dec. 30, 2017.

(51) Int. Cl.

| | |
|---|---|
| B05B 1/08 | (2006.01) |
| B60S 1/52 | (2006.01) |
| G02B 27/00 | (2006.01) |
| B60S 1/56 | (2006.01) |
| B60S 1/54 | (2006.01) |
| G05D 1/02 | (2020.01) |

(52) U.S. Cl.
CPC ................ B60S 1/52 (2013.01); B05B 1/08 (2013.01); B60S 1/54 (2013.01); B60S 1/56 (2013.01); G02B 27/0006 (2013.01); G05D 1/0231 (2013.01); G05D 2201/0213 (2013.01)

(58) Field of Classification Search
CPC ..... B05B 1/08; B05B 1/10; B60S 1/52; B60S 1/54; B60S 1/56; G02B 27/0006; G05D 1/0231; G05D 2201/0213
USPC .............. 239/589.1, 428.5, DIG. 3; 137/826; 4/541.6
See application file for complete search history.

(56) References Cited

U.S. PATENT DOCUMENTS

| | | | |
|---|---|---|---|
| 3,998,386 A | * | 12/1976 | Viets ...................... A62C 31/12 239/589.1 |
| 4,122,845 A | * | 10/1978 | Stouffer ............... A61C 17/028 239/589.1 |
| 5,550,677 A | | 8/1996 | Schofield et al. |
| 5,670,935 A | | 9/1997 | Schofield et al. |
| 5,796,094 A | | 8/1998 | Schofield et al. |
| 6,097,023 A | | 8/2000 | Schofield et al. |
| 6,201,642 B1 | | 3/2001 | Bos |

(Continued)

FOREIGN PATENT DOCUMENTS

DE      102007053986         5/2009

OTHER PUBLICATIONS

International Searching Authority, European Patent Office, International Search Report and Written Opinion for PCT/US2018/067894, dated Mar. 19, 2019.

*Primary Examiner* — Alex M Valvis
(74) *Attorney, Agent, or Firm* — McDonald Hopkins LLC (57) ABSTRACT

The present disclosure relates to automated or remotely controlled methods and apparatuses for cleaning and drying soiled external 2-D or 3-D image sensor surfaces such as objective lenses on Light Detection and Ranging ("LIDAR") sensors when mounted in a configuration that is exposed to dirty environments.

18 Claims, 10 Drawing Sheets

(56) References Cited

U.S. PATENT DOCUMENTS

| | | | |
|---|---|---|---|
| 6,497,375 B1* | 12/2002 | Srinath | A61H 33/6057 |
| | | | 137/803 |
| 6,690,268 B2 | 2/2004 | Schofield et al. | |
| 6,717,610 B1 | 4/2004 | Bos et al. | |
| 7,965,336 B2 | 6/2011 | Bingle et al. | |
| 8,061,630 B2* | 11/2011 | Utz | B05B 1/08 |
| | | | 239/284.1 |
| 9,180,470 B2* | 11/2015 | Zhou | E03C 1/084 |
| 9,831,630 B2 | 11/2017 | Lipson | |
| 9,834,209 B2 | 12/2017 | Stettner et al. | |
| 2010/0078509 A1 | 4/2010 | Utz | |
| 2019/0071057 A1 | 3/2019 | Kluge | |

* cited by examiner

AUTOMOTIVE IMAGE SENSOR SURFACE WASHING AND DRYING SYSTEM

CROSS-REFERENCE TO RELATED APPLICATIONS

This application claims priority to and benefit of U.S. Provisional Application No. 62/612,364 entitled "Image Sensor Surface Washing and Drying system including a Low Profile, Narrow Fan Coverage Drying Air Nozzle Assembly adapted for use with 2-D image sensors and 3-D image systems such as LIDAR systems on vehicles and Method for Making and Aiming Washing and Drying Nozzles" filed Dec. 30, 2017, the entire disclosure of which is incorporated herein by reference. This application is also related to the following commonly owned patent applications on sensor objective lens surface wash systems and methods: U.S. Provisional Application No. 61/451,492 filed Mar. 10, 2011, PCT Application No. PCT/US12/28828 filed Mar. 12, 2012, U.S. application Ser. No. 14/086,746, filed Nov. 21, 2013, U.S. Provisional Application No. 61/978,775, filed Apr. 11, 2014, and U.S. application Ser. No. 15/304,428, published as U.S. Pub. No. 2017/0036647, the entire disclosures of which are incorporated herein by reference.

FIELD OF THE DISCLOSURE

The present disclosure relates to relates to automated or remotely controlled methods and apparatuses for cleaning and drying soiled external 2-D or 3-D image sensor surfaces such as objective lenses on Light Detection and Ranging ("LIDAR") sensors when mounted in a configuration that is exposed to dirty environments.

BACKGROUND

Figure 1A:
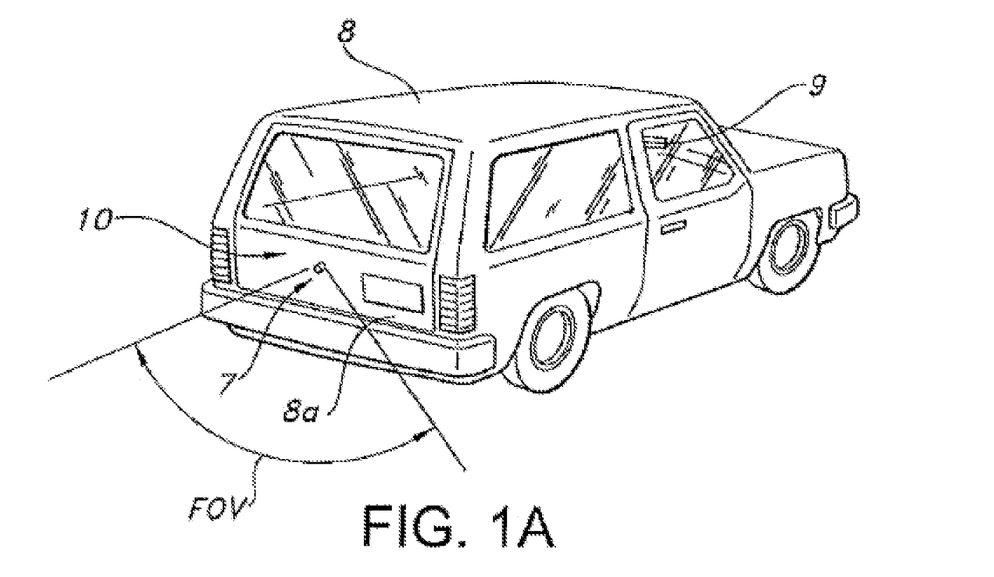
FIGS. 1A and 1B illustrate a vehicle with a back-up camera system as disclosed in U.S. Pat. No. 7,965,336.

External view (e.g., front bumper, side-view, rear-view or back-up) 2-D imaging systems have been added to recreational vehicles and automobiles to enhance the driver's vision and to improve safety. An exemplary system, as illustrated in FIG. 1A, is a rear perspective view of a vehicle with a back-up camera system (see, U.S. Pat. No. 7,965,336). Camera systems such as those illustrated in FIG. 1A, have external objective lens surfaces which accumulate road grime and therefore require cleaning (see, e.g., United States Patent Application Publication No. 2017/0036647). While other co-owned patent applications have provided external camera lens washers that achieve improved lens cleaning, sometimes washer fluid droplets remain within the image sensor's field of view.

As is well known, automotive designers have spent significant development efforts to vehicles which can either drive themselves or use imaging sensors to enhance safety of driver operated vehicles by detecting and avoiding collisions with objects in the vehicles path. Modern safety systems can include collision avoidance systems or adaptive cruise control which rely on 3-D image generation and object detection systems. 3-D image generation and the identification of objects, tracking of objects, road hazard avoidance, and collision avoidance in short range automotive applications can include 3-D (e.g., LiDAR) sensor assemblies having a laser transmitters, laser sensors and digital processors integrated in a housing mounted on a vehicle's body panel. There are examples of 3-D (e.g., LIDAR) sensor assemblies adapted for semi-autonomous or fully autonomous vehicles (see, e.g., U.S. Pat. No. 9,831,630 or 9,834,209) and they also carry external cover surfaces or objective lens surfaces which are prone to becoming soiled. For example, as is illustrated in FIGS. 1D, 1E, 1F and 1G a LIDAR sensor 10 is readily configured for use in an array 30 in a system 80 and each sensor system includes laser emitters and reflected laser energy receivers which operate through lenses 94, 110.

Camera wash nozzles such as Applicant's own may be configured to spray washer fluid to remove dirt or other adherence from the 3-D image sensor (e.g., LIDAR) lens surface, but if washer fluid droplets remain on the external lens surfaces, the emitted or reflected laser energy is disrupted and the sensor is rendered less effective. So some method or apparatus is needed to remove fluid droplets from or dry the external lens surfaces. Typical prior art air nozzles used for drying washer fluid drops from a lens surface are configured as jet or shear nozzles, but both have the limitations of excessively narrow coverage or excessively high flow rate.

Figure 1B:
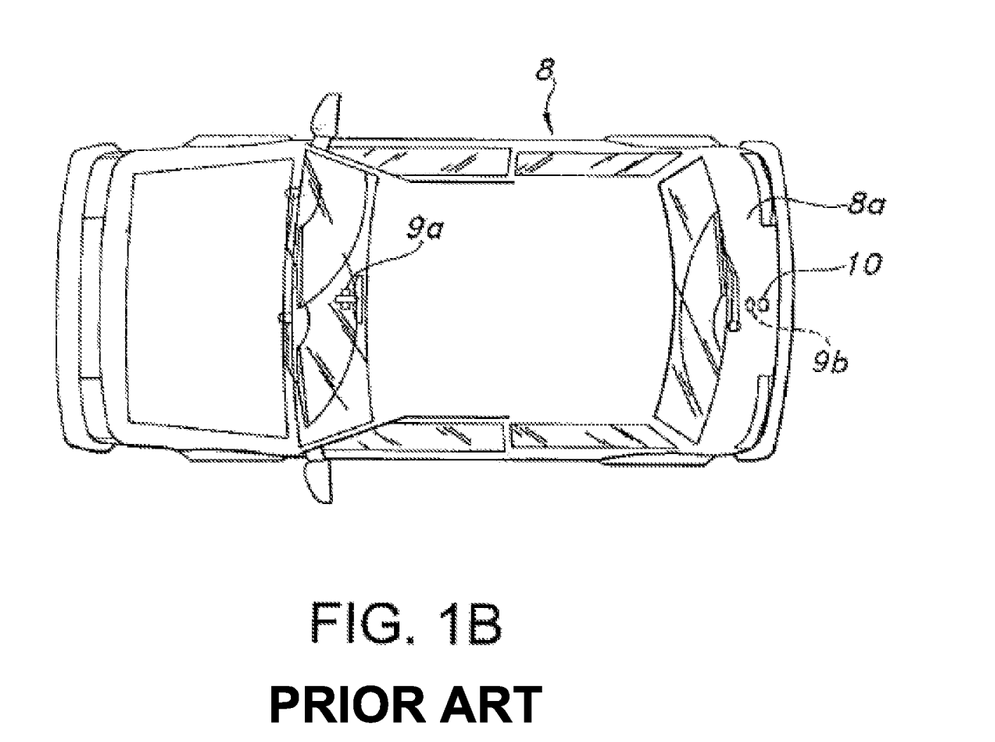
Figure 1C:
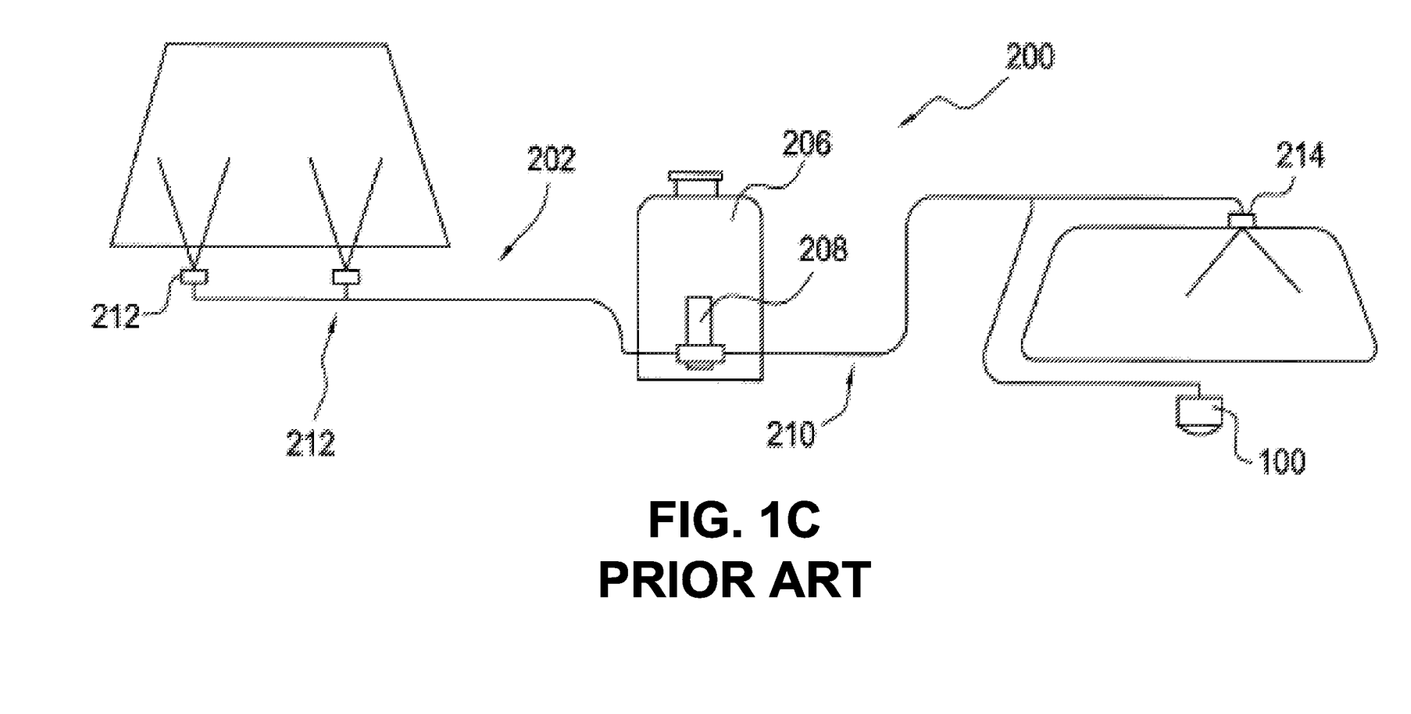
FIG. 1C is a schematic diagram illustrating an automotive imaging system with a nozzle assembly configured for cleaning the imaging system's exterior objective lens surface, in accordance with prior work.
Figure 1D:
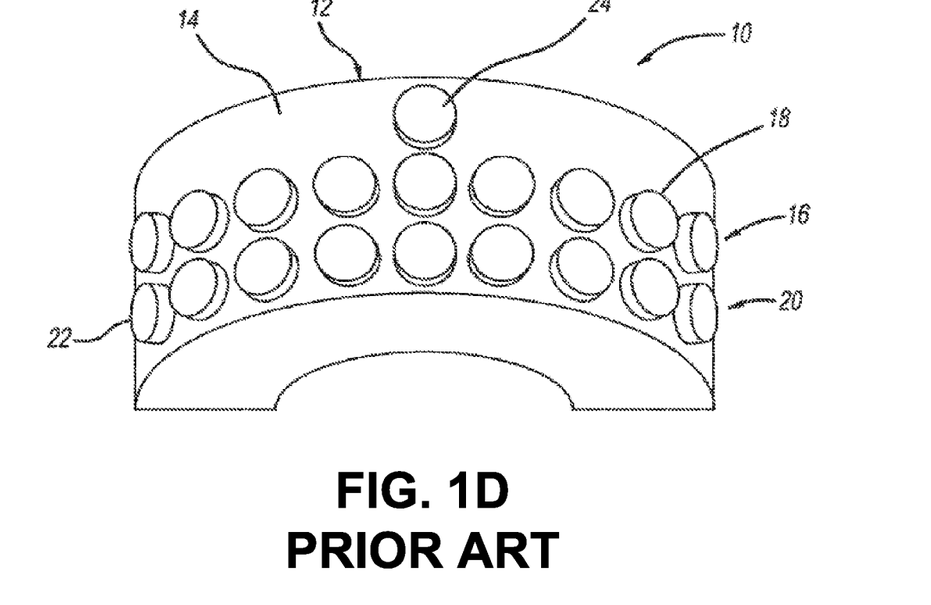
FIGS. 1D through 1G illustrate a LIDAR 3-D imaging system for use in automotive applications in accordance with the Prior Art.
Figure 1E:
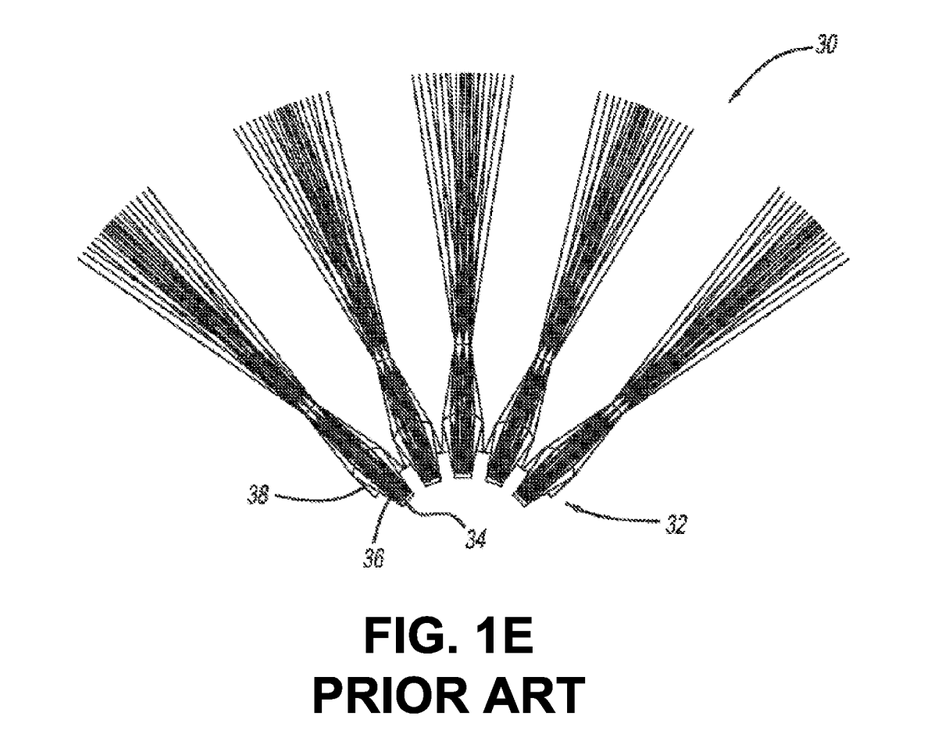
Figure 1F:
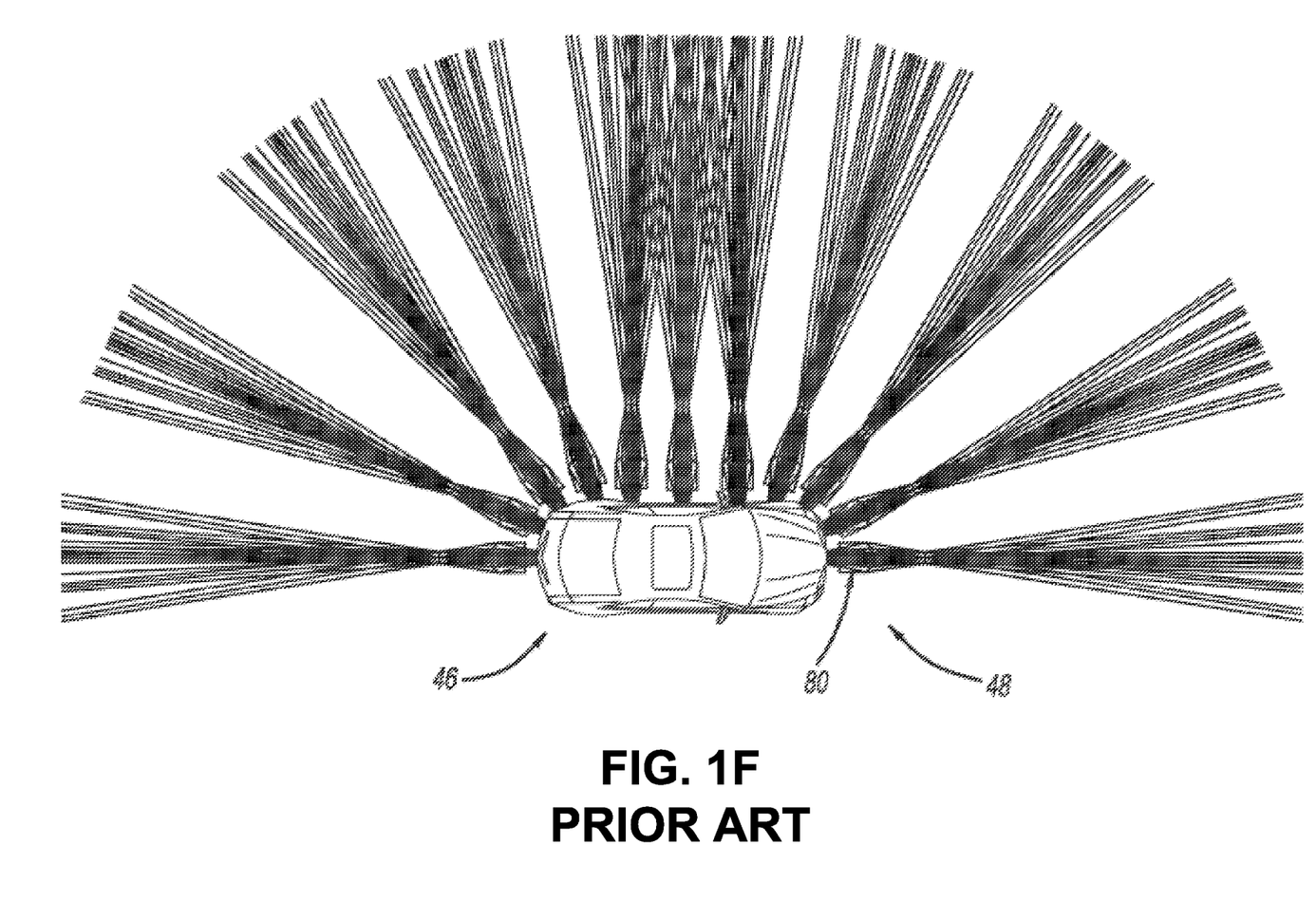
Figure 1G:
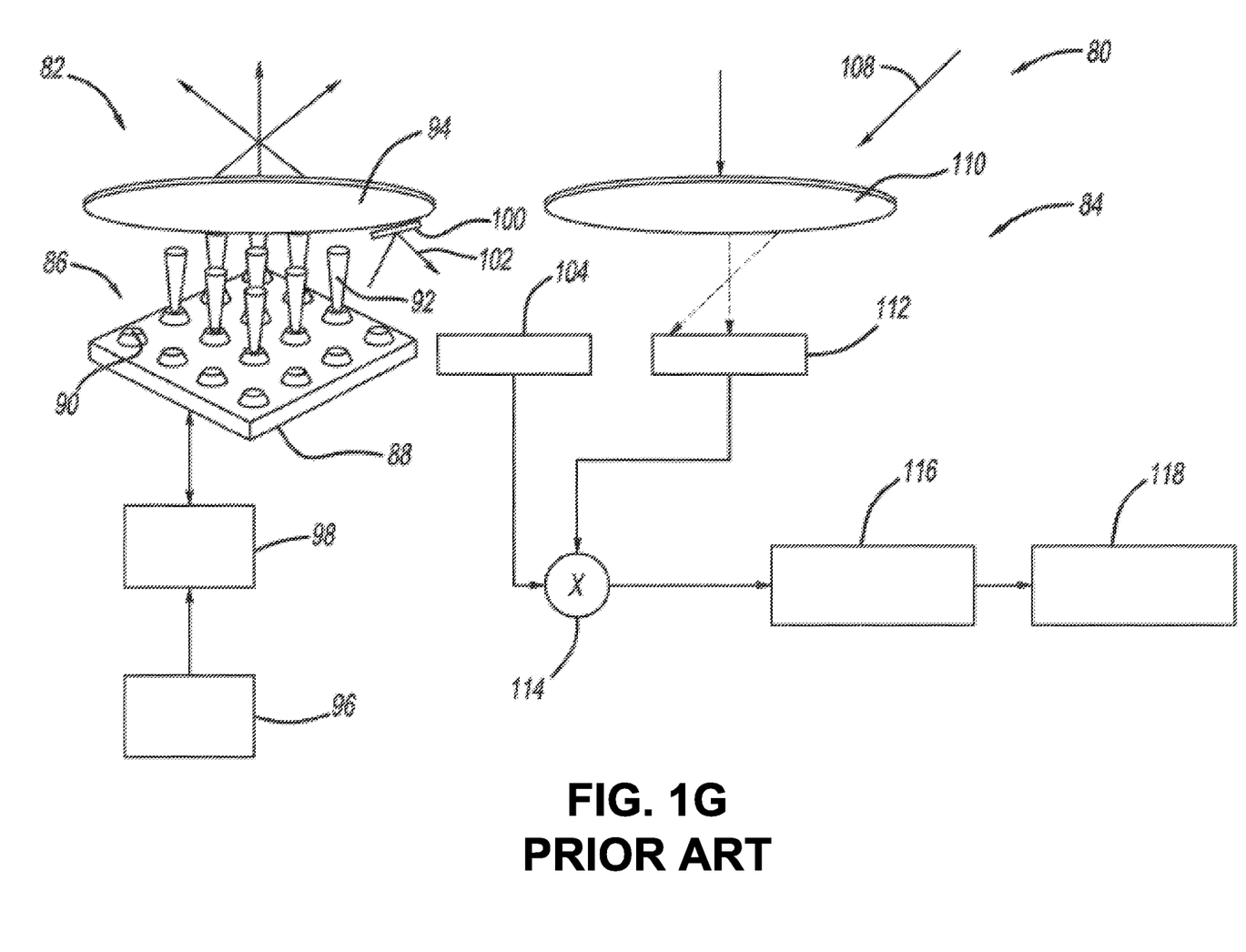

Thus, any drying system must also have a source for air and there is always a demand in vehicle design for less weight, less space and less cost, so any system with excessive demands for air flow rate, large expensive compressors or multiple nozzles will be unsuitable for use on a modern automobile (e.g., reference numeral 46 as illustrated in FIG. 1F). If several sensors are used, as illustrated in FIG. 1F, then the air needed to dry the external sensor surfaces becomes a significant problem. If significant air is needed, then air flow must be generated from an on-board blower of some kind or a system having on-vehicle storage of compressed air. Most passenger vehicles do not have compressed air systems. Adding a compressed air system (which typically includes a compressor and an accumulator) is expensive and troublesome for several reasons, including: (i) added cost to vehicle; (ii) packaging space; and (iii) complexity.

Air dryer nozzles typically require a significant air flow rate (e.g., 30 LPM) and the air exiting into the ambient space near the sensor surface is rapidly diffused. Additionally, the mass of the air stream has to be large enough to overcome the mass of the remaining washer fluid droplets to dry or push the droplet from the surface. Additionally, drying the surface from droplets that cannot be pushed off will require a lot of air which must be distributed to clean a large enough section of sensor, without multiplication of nozzle count. Therefore, requiring large amounts of air is especially awkward in newer high performance vehicles which have many sensors that need cleaning and drying (e.g., as many as 30 to 40 sensors).

In applications such as the system illustrated in FIG. 1F, the amount of air needed is staggering. The available sources for that air (e.g., 12 to 40V on-board compressors) can only supply so much air, and using the systems of the prior art, not enough air is available at the required pressure and flow rates. Conventional jet-style nozzles have the drawback that they have an extremely narrow coverage. Shear-style nozzles have a larger fan range and better coverage, but the input flow rate requirement is excessively large. Package size is also major constraint for camera air cleaning/drying nozzles due to limited available space near sensors and aesthetic and visibility concerns.

If the washer or dryer are located within the 2-D or 3-D image sensor's field of view, they may block a significant portion of the area the sensor would otherwise be capable of monitoring. Another constraint which affects sensor wash applications is that the sensor may be frequently located on an area of the vehicle which sees, or is exposed to, higher levels of contamination than do typical washer nozzle mounting locations, such as on the front grill or the rear lift gate. Washer or dryer nozzles in these locations may be at a higher risk of being clogged by the same material which is obscuring the sensor.

This application is related to commonly owned U.S. provisional patent application No. 61/451,492 filed Mar. 10, 2011, and U.S. provisional patent application No. 61/978,775 filed Apr. 11, 2014; PCT application No. PCT/US12/28828 filed Mar. 10, 2012; U.S. patent application Ser. No. 14/086,746, filed Nov. 21, 2013; U.S. patent application Ser. No. 15/304,428, filed Oct. 14, 2016; and U.S. Pat. No. 6,253,782, the entire disclosures of which are incorporated herein by reference for background and enablement.

Accordingly, it is an object of the present disclosure to overcome the above mentioned difficulties by providing an economical, effective and visually unobtrusive system and method for cleaning and then drying an exterior objective lens or image sensor's exterior surface on a vehicle.

SUMMARY

The present disclosure relates to relates to automated or remotely controlled methods and apparatuses for cleaning and drying soiled external 2-D or 3-D image sensor surfaces such as objective lenses on Light Detection and Ranging ("LIDAR") sensors when mounted in a configuration that is exposed to dirty environments.

Accordingly, it is an object of the present disclosure to overcome the above mentioned difficulties by providing an economical, effective and unobtrusive system and method for cleaning and then drying an image sensor's exterior lens surface or a 3-D sensor (e.g., LIDAR) exterior surface to remove accumulated debris (e.g., accumulated dirt, dust, mud, road salt or other built-up debris), and then dry or remove any residual fluid droplets after the cleaning operation is complete.

In accordance with an exemplary embodiment of the present disclosure, an external lens surface washing and drying system has a number of configurations including an aiming fixture configured to: (a) spray the image sensor's exterior lens surface or 3-D sensor (e.g., LIDAR) exterior surface with washer fluid to wash away soil or debris; and (b) then efficiently generate and aim a narrow fan-shaped stream of drying air at the surface to dry or remove water droplets which remain after washing.

Thus, in one instance, the present disclosure provides a system and method that comprises a novel low profile, low flow air nozzle design which is configured a housing and aimed for drying an image sensor's exterior lens surface or a 3-D sensor (e.g., LIDAR) exterior surface. A shear fan geometry is used but in the present disclosure the low-profile shear fan generating nozzle is configured with plural (e.g., first and second) air entrainment inlet ports located beside the distal wall's opening for the shear fan generating nozzle assembly's exit orifice. In camera cleaning/drying applications, this exemplary embodiment forms a narrow fan by main air flow exit to an expanding outlet at the center of the nozzle assembly insert, and the nozzle assembly insert preferably defines a central diverging channel with multiple (e.g., first and second) air intake ports for additional air entrainment. As a result of the air entrainment, a powerful fan is produced which is much wider than that without air entrainment. As noted above, typical shear-style nozzles provide fans with better coverage, but the input flow rate requirement is excessively large. In the present disclosure, a nozzle with surprisingly high efficiency uses just ⅕th the flow rate of conventional shear nozzles, so cleaning/drying efficacy is improved considerably without consuming additional parasitic air flow rate. With entrained ambient air fed back into the inlet stream for the air nozzle, the shear fan generating nozzle of the present disclosure has an exit flow rate that is much higher than the air dryer nozzle assembly's inlet flow rate and its cleaning/drying efficacy is significantly improved. The output fan is narrow and becomes much thicker, which means a larger output coverage area is dried. A simple low cost manufacture method is also disclosed.

In one embodiment, the present disclosure relates to a fluidic nozzle assembly having therein In one particular instance, the compact fluidic nozzle assembly of the present disclosure includes The above and still further objects, features and advantages of the present disclosure will become apparent upon consideration of the following detailed description of a specific embodiment thereof, particularly when taken in conjunction with the accompanying drawings, wherein like reference numerals in the various figures are utilized to designate like components.

DETAILED DESCRIPTION OF THE DISCLOSURE

Vehicle 2-D or 3-D Imaging System Nomenclature:

In order to provide an exemplary context and basic nomenclature, one is to refer initially to FIGS. 1A through 1G which illustrate a prior art 2-D and 3-D imaging systems as disclosed in U.S. Pat. Nos. 7,965,336 and 9,831,630. These US patents are hereby incorporated by reference herein in order to establish nomenclature and automotive industry standard terminology, in accordance with the Prior Art.

Referring now to FIGS. 1A and 1B, a 2-D image capture system or camera system is positioned at a vehicle 8, such as at a rearward exterior portion 8a of vehicle 8, and is operable to capture an image of a scene occurring interiorly or exteriorly of the vehicle, such as rearwardly of the vehicle, and to display the image at a display or display system 9a of the vehicle which is viewable by a driver or occupant of the vehicle (see, e.g., FIGS. 1A and 1B). The imaging system includes a camera module 10, which is mountable on, at or in the vehicle to receive an image of a scene occurring exteriorly or interiorly of the vehicle, and a control 9b that is operable to process images captured by an image sensor within camera module 10.

Although shown at a rear portion 8a of vehicle 8, camera module 10 may be positioned at any suitable location on vehicle 8, such as within a rear panel or portion of the vehicle, a side panel or portion of the vehicle, a license plate mounting area of the vehicle, an exterior mirror assembly of the vehicle, an interior rearview mirror assembly of the vehicle or any other location where the camera may be positioned and oriented to provide the desired view of the scene occurring exteriorly or interiorly of the vehicle. The image captured by the camera may be displayed at a display screen or the like positioned within the cabin of the vehicle, such as at an interior rearview mirror assembly (such as disclosed in U.S. Pat. No. 6,690,268), or elsewhere at or within the vehicle cabin, such as by using the principles disclosed in U.S. Pat. Nos. 5,550,677; 5,670,935; 5,796,094; 6,097,023; 6,201,642 and/or 6,717,610.

In another prior art camera wash system (reference numeral 310 as illustrated in FIG. 1C), an external camera lens surface is washed with a camera wash nozzle assembly aimed at the camera's external lens surface in sensor and washer assembly 210. Turning to the system diagram of FIG. 1C, the lens washing system is integrated into standard wash fluid pumping equipment already specified for inclusion in many automobiles and other vehicles (e.g., reference numeral 8). As best seen in FIG. 1C, vehicles (e.g., reference numeral 8) configured with an existing windshield washing system ("front wash") or rear window washing system ("rear wash") require use of a washing fluid reservoir and pumping system to provide a supply of pressurized washing fluid. Washer tank or reservoir 290 typically includes an internal pump 292 which is activated to draw washing fluid from the reservoir 290 and supply pressurized fluid to a conduit network 294 (e.g., comprising lumens, tubes or hoses) which supply the windshield washing nozzles 296 and rear window washing nozzle(s) 298. In accordance with one embodiment of this disclosure, the system actuates external lens washing and drying in response to driver control input or automatically.

Referring next to FIGS. 1D through 1G, the system and method disclosed therein is suited for autonomous or semi-autonomous vehicles which use 3-D image generation and object detection systems of the type described and illustrated in U.S. Pat. No. 9,831,630 since they also carry external cover surfaces or objective lens surfaces which are prone to becoming soiled. For example, as is illustrated in FIGS. 1D, 1E, 1F and 1G, LIDAR sensor 10B is readily configured for use in an array 30 in a system 80, several of which are arrayed around the periphery of vehicle 46 and each sensor system includes laser emitters and reflected laser energy receivers which operate through lenses 94, 110.

Figure 2A:
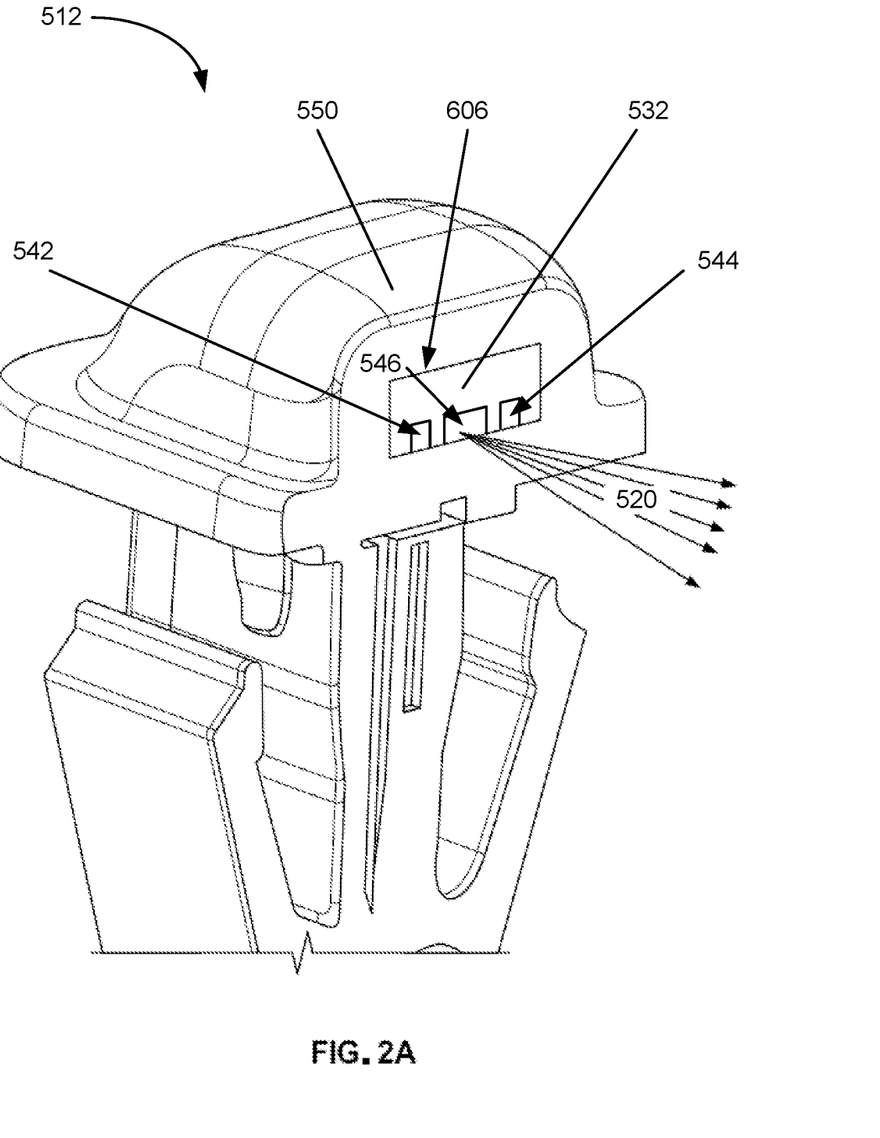
FIG. 2A illustrates a low-profile external lens surface drying system including an aiming fixture, or air dry nozzle assembly, according to one embodiment of the present disclosure.

Integrated Sensor Surface Washing and Drying System:

Turning to FIG. 2A, FIG. 2A illustrates a low-profile external lens surface drying system including an aiming fixture, or air dry nozzle assembly, according to one embodiment of the present disclosure which is configured to efficiently generate and aim a powerful narrow fan-shaped stream of drying air at one or more surfaces in order to dry or remove water droplets on same which may remain on the image sensor's exterior lens surface or 3-D sensor (e.g., LIDAR) exterior surface after washing or rain.

Referring to FIGS. 2A through 7, an external lens surface washing and drying system 500 comprises an aiming fixture 510 configured to support and aim an air dry nozzle assembly 512 configured to efficiently generate and aim a fan-shaped stream of drying air 520 which quickly dries or removes water droplets from washer fluid spray nozzle assembly 514 which may remain on an image sensor's exterior lens surface or 3-D sensor (e.g., LIDAR) exterior surface 530 after washing, in accordance with one embodiment of the present disclosure.

As noted above, there are several challenges which must be overcome if, for example, a LIDAR system's external lens surface (FIG. 7) is to be washed (or exposed to rain) and then cleared of droplets. If camera washer fluid spray nozzle assembly 514 is used to spray washer fluid to remove dirt or other adherence from lens or sensor surface 530, the air dry nozzle assembly 512 needed for drying or removing those drops needs to provide adequate coverage. The prior art jet nozzles and shear nozzles, as discussed above, provide poor coverage and require an excessive amount of drying air to be expended. It should be noted that although FIG. 7 only illustrates one air dry nozzle assembly 512 and one washer fluid spray nozzle assembly 514, there may be a plurality of either one, or both, of 512 and 514 at the same location, or at multiple locations on a vehicle.

As will become clear from the disclosure contained below, the air dry nozzle of the present disclosure overcomes the problems associated with prior art nozzles by efficiently generating and aiming a powerful narrow fan-shaped stream of drying air 520. Typical fluidic nozzles (e.g., moving vortex generating mushroom circuit-based nozzles) have good coverage but require high flow rates for good velocity, and due to the use of air, can be very noisy. While not wishing to be bound to any one theory, the air dry nozzle of the present disclosure increased efficiency is due partly to the inclusion of a plurality of entraining air intake ports (e.g., first and second air intake holes 542 and 544) located beside the outlet orifice, where holes 542 and 544 entrain two air flows to the main fan. One non-limiting advantage of this air entrainment is that the output fan 520 becomes thicker and the exit flow rate is much higher than inlet flow rate. Therefore the power and coverage of fan 520 is increased with the same inlet flow conditions (flow rate, dimensions, etc.). As a result of the entrained flow rate, the cleaning ability of fan 520 is significantly enhanced over prior art blower nozzles.

As is illustrated in FIGS. 2A through 4, air dry nozzle assembly 512 has a housing which is aimed to direct drying air fan 520 distally from outlet throat or orifice 546 which is defined in a distal wall 534 of insert member 532 around which are two air entrainment ports or air intake holes or lumens 542 and 544 symmetrically located on both sides of outlet throat or orifice 546 (also referred to as central exit throat 546). Air from the atmosphere is entrained from air entrainment ports 542 and 544 while high velocity air flow passes through a power nozzle 584 into central exit throat 546. Nozzle assembly insert 532 preferably defines a central diverging channel 580 with opposing diverging walls 551 and 552 defined around a central flow axis with multiple (e.g., first and second) air intake ports 542 and 544 configured as illustrated for additional air entrainment.

Figure 2B:
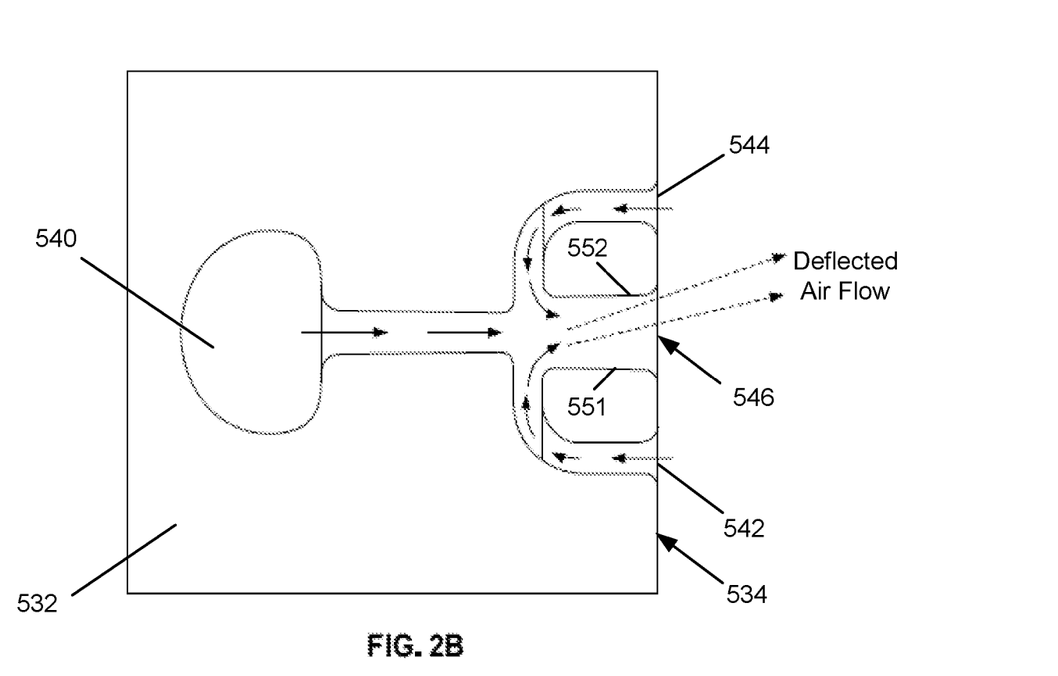
FIG. 2B illustrates one embodiment of an insert member that is used in the air dry nozzle assembly of FIG. 2A.
Figure 3:
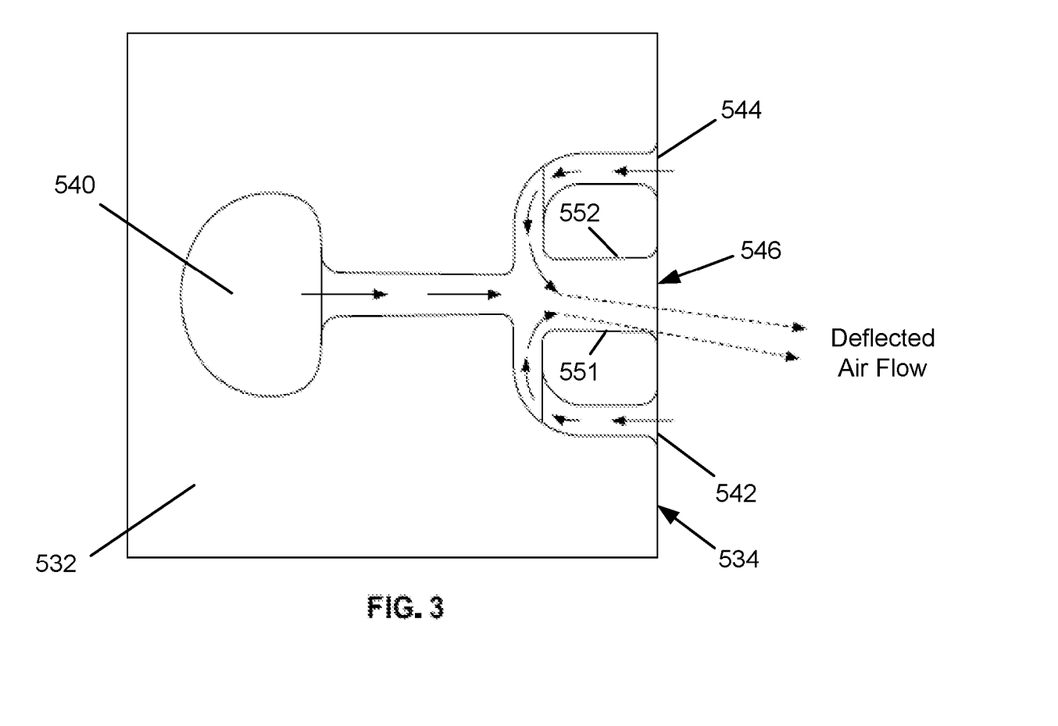
FIG. 3 illustrates another view of an insert member according to one embodiment of the present disclosure.

As illustrated in FIGS. 2B and 3, the main air (drying gas or fluid) flow from the supply of pressurized air is deflected by the air flow entrained from air entrainment ports. As illustrated in FIG. 2B, the input air flow tends to deflect toward either wall segment 551 or wall segment 552 because of the nature of the arbitrary shape of air diffusion. If the air flow deflects toward wall segment 552, more air will be entrained from air entrainment port B (544). If the air flow deflects toward wall segment 551, more air will be entrained from air entrainment port A (542). Because the air flow along the wall near the air entrainment port B (544) becomes stronger and stronger as the main air flow is deflecting toward air entrainment port B (544), more air is entrained through air entrainment port B (544). When the air flow entrained from air entrainment port B (544) is stronger than the air flow entrained from air entrainment port A (542), the main air flow is deflected toward air entrainment port A (542) as is illustrated in FIG. 3. By alternating strength of the air flow entrained through air entrainment port A (542) and air entrainment port B (544), an oscillation cycle can be achieved. This oscillation cycle can be, if desired, repeated multiple times (or even indefinitely for as long as system 500 is in use) and causes the air jet to sweep laterally, so that a central exit throat 546 located between wall segments 551 and 552 becomes like an interaction chamber where the drying air or fluid output jet oscillates in response to attachment and then detachment from wall segments 551 and 552. This lateral sweeping mechanism is unlike the oscillation of various previous moving vortex generating mushroom-style fluidic circuits, in that the oscillation of the present disclosure's system depends on Coanda-like wall attachment and detachment mechanisms involving wall segments 551 and 552 and is caused by the alternating (or varying) flows from entrainment ports A (542) and B (544). When a system according to the present disclosure is tested by placing a small "tell-tale" water droplet near port A (542), and with air flow from the supply through air supply inlet 540, this water droplet exits distally with the deflected main air flow along the wall 552.

Figure 4:
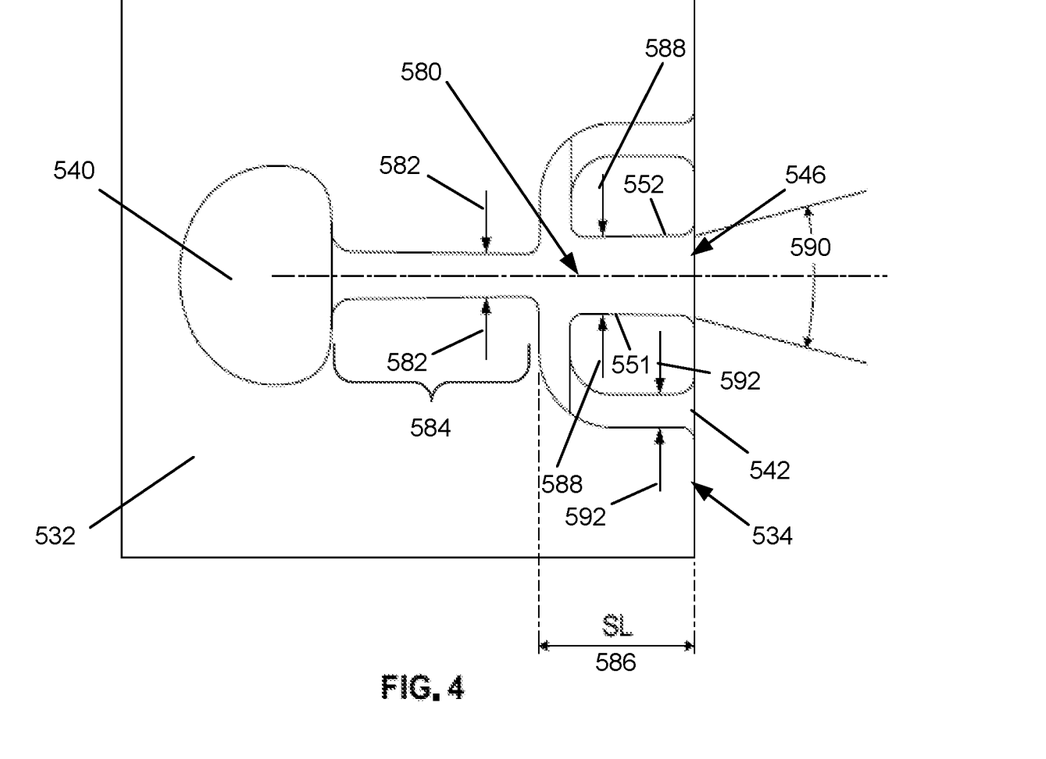
FIG. 4 illustrates another view of an insert member according to one embodiment of the present disclosure.

Insert 532, as illustrated in FIGS. 2B, 3 and 4 is optimized in one non-limiting embodiment for use with an inlet flow rate (air or drying gas) of 5 L/min at 25 psi to generate a swept 30° fan. The insert member, or insert chip, 532 has troughs or grooves defined in a surface to provide channels or lumens which provide fluid communication for air or gas flows, once inserted into a socket or receiving aperture in housing 550. The grooves or troughs defined in insert member, or insert chip, 532 define the shape and length of the channels or lumens which provide the drying air flow and the critical dimensions of those channels are expressed in terms of relative width or depth to provide a cross sectional area for the lumens. Air flows into an air supply inlet 540 which is in fluid communication with a distally aligned central channel or lumen terminating in a power nozzle having a power nozzle width PW 582 (see FIG. 4). The first air entrainment port lumen 542 has its inlet in the insert's distal wall segment 534 and has its outlet aligned perpendicularly to the central flow axis, intersecting with the central channel 580 at the power nozzle 584 which is set back from the distal wall 534 by an axial setback length (SL) 586 which is in one embodiment in the range of about 1.2 mm to about 1.75 mm.

Figure 5A:
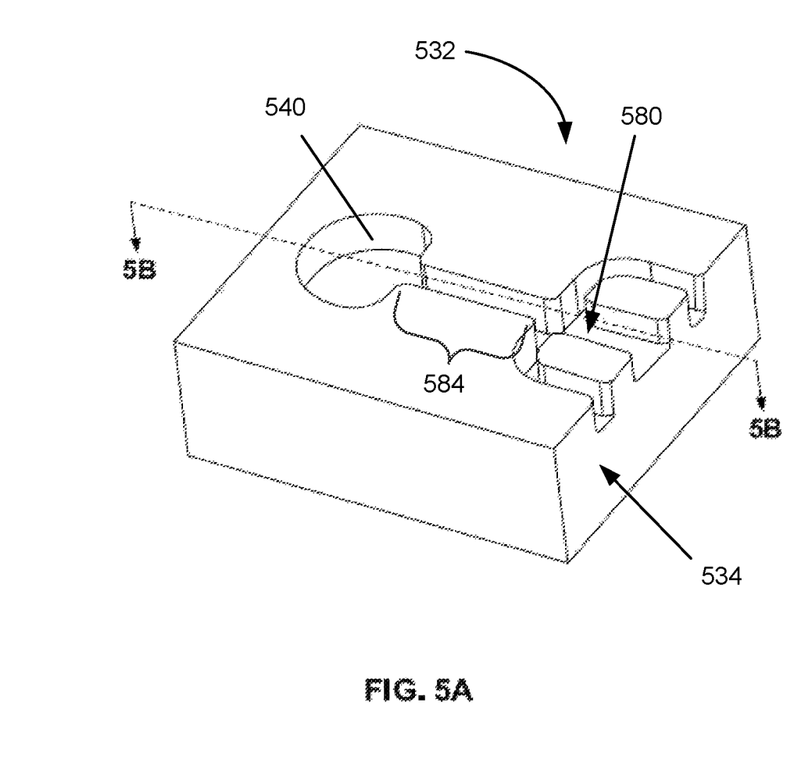
FIG. 5A is a perspective illustration of an insert member according to one embodiment of the present disclosure.
Figure 5B:
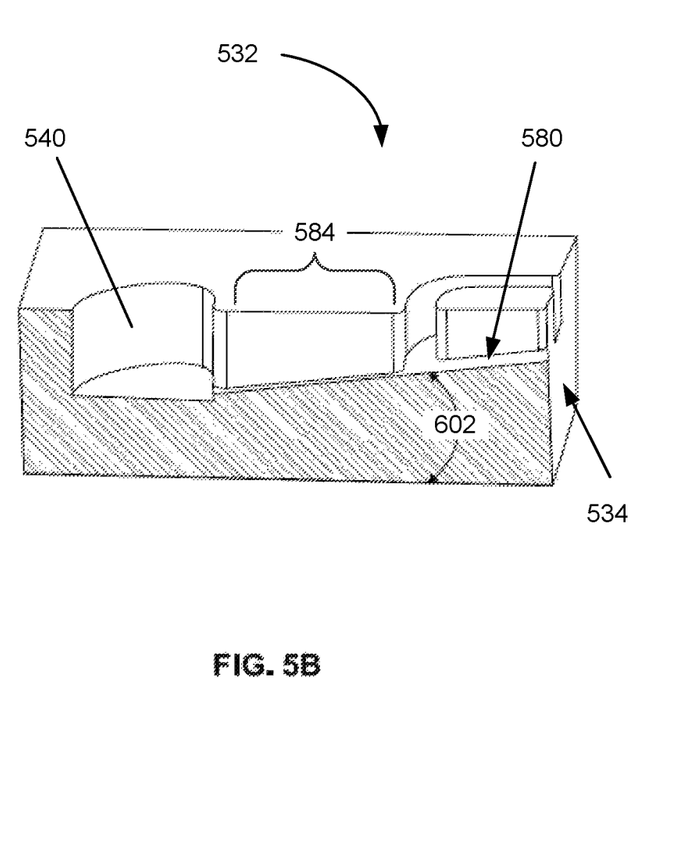
FIG. 5B is a cross-sectional illustration along the A-A line of FIG. 5A of an insert member according to one embodiment of the present disclosure.
Figure 6:
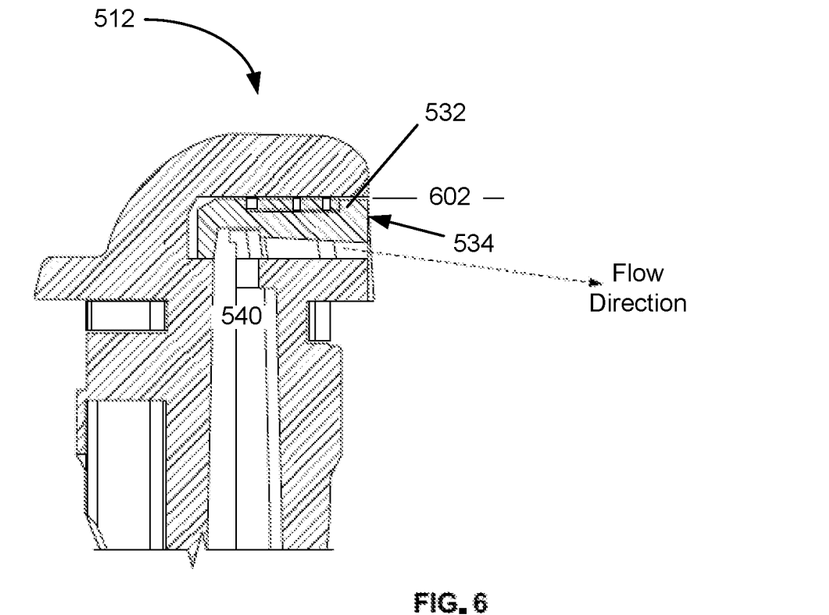
FIG. 6 is a cross-sectional illustration of a low-profile external lens surface drying system including an aiming fixture, or air dry nozzle assembly, according to one embodiment of the present disclosure.

In one embodiment, PW (Power nozzle Width 582) is equal to about 0.4 mm, SW (Setback Width 588) is equal to about 1.5× to about 2× the PW (or in one instance where PW is about 0.4 mm, SW is in the range of about 0.6 mm to about 0.8 mm), the outlet angle 590 is equal to about 4° to about 10°, and an air intake width 592 of one, or both, of ports 542 and 544 are independently in the range of about 0.75× to about 2.5× the PW (or in one instance where PW is about 0.4 mm, in the range of about 0.3 mm to about 1.0 mm). The ratios of all those parameters are important to achieve highly efficient performance for air dryer nozzle assembly 512 in system 500. The floor taper angle 602 (see FIG. 5) is used for generating an aim angle 604 (see FIG. 6).

Figure 7:
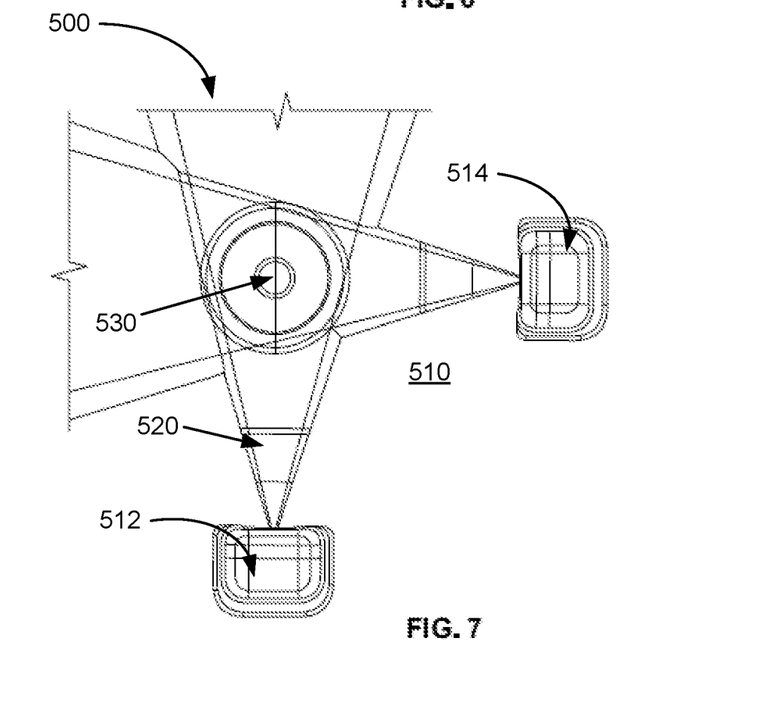
FIG. 7 is an illustration of one external lens surface washing and drying system according to an embodiment of the present disclosure.

The structure and method of the present disclosure provide a new and non-obvious way to increase output coverage of a fan-shaped stream of drying air 520 without changing inlet conditions (flow rate, dimensions, etc.). As illustrated in FIGS. 2A through 6, the air entrained in air dry nozzle assembly 512 is designed for drying or driving fluid droplets from LIDAR lens surface (or sensor surface) 530 after washer cleaning or rain. The drying air output fan 520 is thick (from top to bottom, as seen in FIG. 7). The pressurized air or drying gas flows into air supply inlet 540 and is redirected along the central channel, as is illustrated in FIGS. 2B and 3, and entrained intake air flows into and through first and second intake ports (air entrainment port A (542) and air entrainment port B (544), respectively) and is combined with and accelerated distally by air forced distally through the outlet orifice or throat 546 (also referred to as central exit throat 546). The entrained air flows taken in via air entrainment port A (542) and air entrainment port B (544) are added to the air flow from air supply inlet 540. The drying air output from spray fan 520 becomes wider and thicker because of the air entraining effect. Therefore the coverage for a fan-shaped stream or air 520 is much larger with air entrainment.

As is illustrated in FIGS. 2B through 5B, nozzle insert member 532 has a block-shaped body with planar surface into which is molded a network of interconnected troughs or grooves defining, at a proximal end, a proximal lumen opening or air supply inlet 540 which receives supplied inlet air (or an equally effective washer fluid removing or drying gas). The distal portion of nozzle body defines a substantially orthogonal distal wall segment 534 in which is defined the distally aimed outlet orifice or throat 546 (also referred to as central exit throat 546). In one embodiment, air dry nozzle assembly 512 includes at least one air dry nozzle insert member 532 which is slidably received within and retained within an insert-receiving socket, chamber or lumen 606 in housing 550 which has a distal insert receiving opening and a central axis that is aligned along an axis coincident with the aiming axis for drying air fan 520. The insert receiving socket or chamber 606 is in fluid communication with the source of pressurized air or drying gas which may flow through the nozzle insert member inlet 532 and distally toward the throat to generate the exhaust flow of drying air or gas 520 to evaporate or move fluid droplets. The air dry nozzle assembly 512 defines at least one insert-receiving conformal and substantially rigid housing having a cavity or socket for at least one insert 532, where each cavity is configured and aligned to receive and aim an air dry insert or chip member along the center of the drying air fan axis.

When in use, drying air flow from the nozzle member's air supply inlet 540 converges with and draws in air entrained via entrainment ports 542 and 544 at the set back intersection and the combined, oscillating flow is forced distally to generate a laterally oscillating spread sheet or fan shaped pattern of drying air 520 as illustrated in FIGS. 2B and 3. The fan-shaped pattern of drying air is directed onto the cleaning/drying target area on sensor surface 530. As noted above, FIG. 7 illustrates an application of this disclosure in air drying LIDAR lens 530.

In accordance with one embodiment of the present disclosure, washer spray nozzle assembly 514 sprays washer fluid to clean lens surface 530 and air dry nozzle assembly 512 blows high velocity air with a wide and thick fan 520 to dry or remove any remaining washing fluid droplets. In one embodiment, both the fluid sprayed for washing from washer fluid spray nozzle assembly 514 and the drying air fan 520 are aimed at the same target area on lens 530 and have fan widths (or impacted target areas) on that surface which are substantially co-extensive. Both fluid and air fan output thickness (meaning the top-to bottom spray thickness) in this application are preferably greater than 20°.

In one exemplary embodiment, an air inlet flow rate of under 5 L/min is effective from a supply (inlet pressure) operating at 25 psi. Air output flow rate is a surprisingly high and efficacious 32 L/min because of the air entrained from the entrainment inlet ports, or air holes, 542 and 544 located in the distal wall 534. In this instance, no large droplets (e.g., droplets having a diameter greater than 2 mm) are left on lens surface 530 after 2 seconds of air blowing from air dry nozzle assembly 512.

In one instance, air dry nozzle assembly 512's insert member 532 can be molded in one piece as is illustrated in FIGS. 2B through 5B. Any flash, or excess material, at outlet orifice or throat 546 (also referred to as central exit throat 546) defining the exit or outlet orifice is likely to adversely affect the output pattern of the fan-shaped stream 520 of drying air. The tooling of this insert part or insert member 532 is straightforward to mold and creates no nettlesome parting line flash at the portion which, once assembled, defines outlet orifice or throat 546 (also referred to as central exit throat 546).

As noted above, a key problem to be addressed by system 500 and the method of the present disclosure is the paucity of space and the economics of on-vehicle storage of compressed air. Most passenger vehicles do not have compressed air systems and adding a compressed air system (preferably a compressor and an accumulator) is expensive, takes up precious space and adds complexity, but the system of the present disclosure helps minimize the expense and the space requirements, because the air nozzle of the present disclosure (e.g., 512) requires much less than 30 LPM, and the drying air fan 520 is accelerated toward the surface 530 and not rapidly diffused. Thus, less air is needed. Additionally, the mass and velocity of the air stream in a fan-shaped stream 520 are large enough to overcome the mass of fluid droplets, so the droplets are dried or pushed off surface 530 and air is distributed to clean a large enough section of a sensor surface, without requiring multiple air nozzles.

Requiring large amounts of air might be manageable with single sensors, but new high performance vehicles are starting to have more than one sensor that needs cleaning and drying. In extreme cases, one could expect to need to dry; singly, in zones, or all at once, as many as 30 to 40 sensors, and using the drying systems of the prior art, the amount of air needed is unmanageable. The system of the present disclosure (e.g., 500) can be used very effectively drying multi sensor arrays in zones to allow the system to handle smaller chunks limiting the amount of air needed at any instance, transitioning from one zone to the next. This allows the system of the present disclosure to work effectively (even with LIDAR systems) with 12V to 40V onboard compressors using the zone approach, at the required pressure and flow rates. In one embodiment, the system of the present disclosure includes an accumulator and compressor sized such that enough compressed air can be stored to supply the sensor blow off needs, whatever the configuration. In extreme applications such as vehicles with many sensor arrays, multiple automotive compressors could be required to make-up air needed to generate drying air. Thus, in one embodiment, the system (e.g., 500) and method of the present disclosure reduces the system level packaging size by entraining additional air from the environment, thereby reducing the supply requirement from the system and therefore the sizing of every component in that system (e.g., supply tube size, compressor size and accumulator size). In still another embodiment, system 500 of the present disclosure can be used to spray air, a gas, or even any desired liquid through assembly 512.

In one embodiment, insert 532 of the present disclosure can be made by injection molding from any suitable material including, but not limited to, any suitable plastic or polymer material. Alternatively, insert 532 could be printed using a 3D printer from any suitable material including, but not limited to, any suitable plastic or polymer material. Housing 550 can be formed from any suitable material such as any metal, metal alloy, plastic or polymer and can be made from molding, casting, injection molding, or 3D printing.

Field of View (FOV) Considerations:

It should be understood that many existing cameras have Field of View Angles from 120° to 170° (e.g., as indicated by radial lines). A major constraint to system functionality is to have nothing intrude into the displayed field of view of the camera (e.g., 10, 10B or 210), so that the control system or user is not interfered with or distracted by the appearance of the sensor surface washing and drying system 500 or any part thereof. Thus the drying and washing nozzle assembly members (e.g., 512 and 514, respectively) should be laterally positioned from and yet aimed back at the sensor's FOV. In the illustrated embodiments of the present disclosure, nozzle assemblies 512 and 514 are oriented and aimed from a fixed location to be away from (e.g., below) the FOV of the sensor. In the embodiment of FIGS. 2A through 6, the nozzles of system 500 create fluid and drying air distributions such that the entirety, or as much as possible, of the sensor surface 530 is covered by washing fluid and drying air which impinge the sensor surface at a selected aim angle.

Having described preferred embodiments of a new and improved assembly, system and method, it is believed that other modifications, variations and changes will be suggested to those skilled in the art in view of the teachings set forth herein. It is therefore to be understood that all such variations, modifications and changes are believed to fall within the scope of the present invention.

Although the present embodiments have been illustrated in the accompanying drawings and described in the foregoing detailed description, it is to be understood that the external lens washing and drying methods and assemblies are not to be limited to just the embodiments disclosed, but that the systems and assemblies described herein are capable of numerous rearrangements, modifications and substitutions. The exemplary embodiment has been described with reference to the preferred embodiments. Obviously, modifications and alterations will occur to others upon reading and understanding the preceding detailed description. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claims.

What is claimed is:

1. A fluidic nozzle insert comprising:
a body, the body having a back edge and a forward edge, where the body has formed therein:
a fluidic supply inlet having a back portion and a front portion;
a power nozzle channel, the power nozzle channel having a back end and a forward end, where the power nozzle channel is formed so that the back end of the power nozzle channel is in operative fluidic communication with at least one forward portion of the fluidic supply inlet;
a central channel, the central channel having a back end and a forward end, where the central channel is formed so that the back end of the central channel is in operative fluidic communication with the forward end of the power nozzle channel and the forward end of the central channel is open through the forward edge of the body; and
two air intake channels, where each individual air intake channel has a forward opening formed in the forward edge of the body and a backward opening that is in operative fluidic communication with back end of the central channel, the forward opening is aligned substantially perpendicularly to an axis of the central channel,
wherein the central channel has a width that is wider than a width of the power nozzle channel,
wherein the two air intake channels are formed on either side of the central channel,
wherein the power nozzle channel is formed so as to have an axial setback length (SL) from the forward edge of the body in the range of about 1.2 mm to about 1.75 mm such that the power nozzle channel has a power nozzle width (PW) that is in the range of about 0.3 mm to about 1.0 mm,
wherein each of the two air intake channels formed on either side of the central channel have a setback distance from the central channel defined as the setback width (SW) equal to about 1.5× to about 2× the power nozzle width (PW), and
wherein each of the air intake channels' forward opening are independently in the range of about 0.75× to about 2.5× the power nozzle width (PW).

2. The fluidic nozzle insert of claim 1, wherein the central channel has sloping walls that taper from wider to narrower from the forward end to the back end at an angle in the range of about 4° to about 10°.

3. The fluidic nozzle insert of claim 1, wherein the fluidic nozzle is designed to supply air or another gas from the forward end of the central channel.

4. The fluidic nozzle insert of claim 1, wherein the fluidic nozzle is designed to supply at least one liquid from the forward end of the central channel.

5. The fluidic nozzle insert of claim 1, wherein the two air intake channels permit air to flow into the central channel from the forward opening formed in the forward edge of the body in the direction of the backward opening that is in operative fluidic communication with the back end of the central channel.

6. The fluidic nozzle insert of claim 1, wherein the two air intake channels permit an air output from the forward end of the central channel to oscillate.

7. The fluidic nozzle insert of claim 1, wherein the two air intake channels permit a fluid from the forward end of the central channel to oscillate.

8. The fluidic nozzle insert of claim 1, wherein the fluidic nozzle insert is formed from an injection moldable plastic or polymer material.

9. The fluidic nozzle insert of claim 1, wherein the fluidic nozzle insert is formed from a 3D printing process.

10. A fluidic nozzle assembly comprising:
a fluidic nozzle assembly comprising:
a nozzle post, wherein the nozzle post is designed to be mountable;
a fluidic nozzle insert:
a raised fluidic nozzle insert receptacle, wherein the nozzle insert receptacle is designed to receive at least one fluidic nozzle insert in at least one cavity formed therein; and
a nozzle body, wherein the nozzle body is located between and connects both the nozzle post and the a raised fluidic nozzle insert receptacle,
wherein the fluidic nozzle insert comprises:
a body, the body having a back edge and a forward edge, where the body has formed therein:
a fluidic supply inlet having a back portion and a front portion;
a power nozzle channel, the power nozzle channel having a back end and a forward end, where the power nozzle channel is formed so that the back end of the power nozzle channel is in operative fluidic communication with at least one forward portion of the fluidic supply inlet;
a central channel, the central channel having a back end and a forward end, where the central channel is formed so that the back end of the central channel is in operative fluidic communication with the forward end of the power nozzle channel and the forward end of the central channel is open through the forward edge of the body; and
two air intake channels, where each individual air intake channel has a forward opening formed in the forward edge of the body and a backward opening that is in operative fluidic communication with back end of the central channel, the forward opening is aligned substantially perpendicularly to an axis of the central channel;
wherein the central channel has a width that is wider than a width of the power nozzle channel,
wherein the two air intake channels are formed on either side of the central channel,
wherein the power nozzle channel is formed so as to have an axial setback length (SL) from the forward edge of the body in the range of about 1.2 mm to about 1.75 mm such that the power nozzle channel has a power nozzle width (PW) that is in the range of about 0.3 mm to about 1.0 mm,
wherein each of the two air intake channels formed on either side of the central channel have a setback distance from the central channel defined as the setback width (SW) equal to about 1.5× to about 2× the PW distance, and
wherein each of the air intake channels' forward opening are independently in the range of about 0.75× to about 2.5× the PW distance.

11. The fluidic nozzle assembly of claim 10, wherein the central channel of the fluidic nozzle insert has sloping walls that taper from wider to narrower from the forward end to the back end at an angle in the range of about 4° to about 10°.

12. The fluidic nozzle assembly of claim 10, wherein the fluidic nozzle of the fluidic nozzle insert is designed to supply air or another gas from the forward end of the central channel.

13. The fluidic nozzle assembly of claim 10, wherein the fluidic nozzle of the fluidic nozzle insert is designed to supply at least one liquid from the forward end of the central channel.

14. The fluidic nozzle assembly of claim 10, wherein the two air intake channels of the fluidic nozzle insert permit air to flow into the central channel from the forward opening formed in the forward edge of the body in the direction of the backward opening that is in operative fluidic communication with the back end of the central channel.

15. The fluidic nozzle assembly of claim 10, wherein the two air intake channels of the fluidic nozzle insert permit an air output from the forward end of the central channel to oscillate.

16. The fluidic nozzle assembly of claim 10, wherein the two air intake channels of the fluidic nozzle insert permit a fluid from the forward end of the central channel to oscillate.

17. The fluidic nozzle assembly of claim 10, wherein the fluidic nozzle insert of the fluidic nozzle assembly is formed from an injection moldable plastic or polymer material.

18. The fluidic nozzle assembly of claim 10, wherein the fluidic nozzle insert of the fluidic nozzle assembly is formed from a 3D printing process.

\* \* \* \* \*